(12) United States Patent
Nakamura et al.

(10) Patent No.: US 12,044,359 B2
(45) Date of Patent: Jul. 23, 2024

(54) HIGH-PRESSURE TANK AND METHOD OF MANUFACTURING THE SAME

(71) Applicant: TOYOTA JIDOSHA KABUSHIKI KAISHA, Toyota (JP)

(72) Inventors: Hironori Nakamura, Nagakute (JP); Koji Katano, Toyota (JP); Daisuke Satoya, Nisshin (JP); Takuya Kobayashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/810,665

(22) Filed: Jul. 5, 2022

(65) Prior Publication Data

US 2023/0010853 A1    Jan. 12, 2023

(30) Foreign Application Priority Data

Jul. 8, 2021    (JP) .................................. 2021-113632

(51) Int. Cl.
 F17C 1/02    (2006.01)

(52) U.S. Cl.
 CPC ........ *F17C 1/02* (2013.01); *F17C 2201/0109* (2013.01); *F17C 2203/011* (2013.01); *F17C 2203/0604* (2013.01); *F17C 2203/0624* (2013.01); *F17C 2203/0673* (2013.01); *F17C 2205/0305* (2013.01); *F17C 2209/2163* (2013.01); *F17C 2209/22* (2013.01); *F17C 2221/012* (2013.01); *F17C 2270/0168* (2013.01); *F17C 2270/0184* (2013.01)

(58) Field of Classification Search
 CPC ........ F17C 2201/0109; F17C 2203/011; F17C 2203/0604; F17C 1/06; F17C 2203/0607; F17C 1/00; F17C 1/16
 USPC ........................................................ 220/589
 See application file for complete search history.

(56) References Cited

U.S. PATENT DOCUMENTS

| | | | |
|---|---|---|---|
| 5,758,796 A * | 6/1998 | Nishimura | F17C 1/06 220/651 |
| 8,517,206 B2 | 8/2013 | Liu | |
| 2009/0263315 A1 * | 10/2009 | Mehta | F17C 1/00 156/69 |

(Continued)

FOREIGN PATENT DOCUMENTS

JP    2012149739 A    8/2012

*Primary Examiner* — Robert Poon
(74) *Attorney, Agent, or Firm* — Hunton Andrews Kurth LLP

(57) ABSTRACT

A high-pressure tank includes an assembly of a pipe split body having a pipe liner and a pipe reinforcement layer covering an outer circumferential surface of the pipe liner, first dome split body having a first dome liner and a first dome reinforcement layer covering an outer circumferential surface of the first dome liner, and second dome split body having a second dome liner and a second dome reinforcement layer covering an outer circumferential surface of the second dome liner. The pipe split body and the first dome split body are assembled such that the first dome liner is located in the outer portion of the high-pressure tank relative to the pipe liner. The pipe split body and the second dome split body are assembled such that the second dome liner is located in the outer portion of the high-pressure tank relative to the pipe liner.

2 Claims, 11 Drawing Sheets

(56) References Cited

U.S. PATENT DOCUMENTS

| | | | | |
|---|---|---|---|---|
| 2010/0276434 A1* | 11/2010 | Berger | ............... | F17C 1/16 |
| | | | | 427/372.2 |
| 2021/0131610 A1* | 5/2021 | Kim | ............... | F17C 1/10 |
| 2022/0032531 A1* | 2/2022 | Katano | ............... | B29C 53/602 |
| 2022/0034450 A1* | 2/2022 | Katano | ............... | B29C 53/66 |
| 2022/0034451 A1* | 2/2022 | Katano | ............... | F17C 1/06 |
| 2022/0099251 A1* | 3/2022 | Katano | ............... | F17C 1/06 |

\* cited by examiner

HIGH-PRESSURE TANK AND METHOD OF MANUFACTURING THE SAME

CROSS-REFERENCE TO RELATED APPLICATION

This application claims priority to Japanese Patent Application No. 2021-113632 filed on Jul. 8, 2021, incorporated herein by reference in its entirety.

BACKGROUND

1. Technical Field

The disclosure relates to a high-pressure tank and a method of manufacturing the high-pressure tank.

2. Description of Related Art

A high-pressure tank installed in a fuel cell electric vehicle, or the like, is known which includes a liner having a cylindrical pipe portion and a pair of dome portions provided at axially opposite ends of the pipe portion, and a reinforcement layer made of fiber-reinforced resin and covering an outer circumferential surface of the liner. The high-pressure tank having this structure is manufactured by first forming the liner, and forming the reinforcement layer by winding fiber bundles impregnated with resin around the outer circumferential surface of the liner by a filament winding method (FW method), using the formed liner as a winding core (see, for example, Japanese Unexamined Patent Application Publication No. 2012-149739 (JP 2012-149739 A)).

SUMMARY

Recently, as an alternative to the manufacturing method described above, a manufacturing method is being considered that uses a mold to fabricate split bodies of a reinforcement layer, and places the split bodies of the reinforcement layer on the outside of a liner that is separately prepared. However, when this manufacturing method is employed, the high-pressure tank cannot be easily produced because of the required accuracy in size matching between the liner and the split bodies of the reinforcement layer.

The disclosure provides a high-pressure tank that is easily manufactured and a method of manufacturing the high-pressure tank.

A high-pressure tank according to a first aspect of the disclosure includes an assembly having a pipe split body and two dome split bodies assembled together, and a helical layer provided outside the assembly. The pipe split body has a pipe liner and a pipe reinforcement layer covering an outer circumferential surface of the pipe liner, and each of the dome split bodies has a dome liner and a dome reinforcement layer covering an outer circumferential surface of the dome liner. The pipe split body and the two dome split bodies are assembled such that the dome liner is located in an outer portion of the high-pressure tank relative to the pipe liner.

In the high-pressure tank according to the first aspect, the pipe split body has the pipe liner and the pipe reinforcement layer covering the outer circumferential surface of the pipe liner, and each of the dome split bodies has the dome liner and the dome reinforcement layer covering the outer circumferential surface of the dome liner. The pipe split body and the two dome split bodies are assembled such that the dome liner is located in the outer portion of the high-pressure tank relative to the pipe liner. Thus, the liner can be formed simply by assembling the dome split bodies and the pipe split body, thus making it easy to manufacture the high-pressure tank.

In the high-pressure tank according to the first aspect, an end portion of the pipe liner may be a folded end portion that is folded back toward an outside of the high-pressure tank, and the folded end portion of the pipe liner may be in contact with the dome liner, in an assembled region of the pipe split body and each of the dome split bodies. With this arrangement, the sealing performance of the liner formed by the pipe liner and the dome liners can be ensured.

In the high-pressure tank according to the first aspect, the helical layer may have a high helical layer configured to cover at least the pipe split body, and an outer helical layer provided outside the high helical layer, and the high helical layer may extend over a part of each of the dome split bodies beyond an assembled region of the pipe split body and each of the dome split bodies. With this arrangement, the pipe liner and the dome liner can be kept in the contact state, and distortion in the assembled region of the pipe split body and the dome split body can be reduced. As a result, the effect of enhancing the sealing performance of the high-pressure tank is provided.

A method of manufacturing a high-pressure tank according to a second aspect of the disclosure is that of manufacturing a high-pressure tank including an assembly having a pipe split body and two dome split bodies assembled together, and a helical layer provided outside the assembly. The method includes a split body formation process of respectively forming the pipe split body having a pipe liner and a pipe reinforcement layer covering an outer circumferential surface of the pipe liner, and the dome split bodies each having a dome liner and a dome reinforcement layer covering an outer circumferential surface of the dome liner, an assembling process of forming the assembly by assembling the pipe split body with the two dome split bodies, and a helical layer formation process of forming the helical layer outside the assembly. In the assembling process, the pipe split body and the two dome split bodies are assembled such that the dome liner is located in an outer portion of the high-pressure tank relative to the pipe liner.

In the method of manufacturing the high-pressure tank according to the second aspect, in the assembling process, the pipe split body and the dome split body are assembled such that the dome liner is located in the outer portion of the high-pressure tank relative to the pipe liner. Thus, the liner can be formed simply by assembling the dome split bodies with the pipe split body, thus making it easy to manufacture the high-pressure tank.

In the method of manufacturing the high-pressure tank according to the second aspect, in the assembling process, the pipe split body may be press-fitted into each of the dome split bodies such that the dome liner contacts the pipe reinforcement layer without contacting the pipe liner. In this case, compared with the case where the pipe split body is press-fitted into the dome split body such that the dome liner directly contacts the pipe liner, there is no rubbing of the liners against each other during press-fitting, and the sealed portion thus formed can be prevented from being damaged. Consequently, the sealing performance of the liner can be ensured.

In the method of manufacturing the high-pressure tank according to the second aspect, the helical layer formation process may have a high helical layer formation process of forming a high helical layer that covers at least the pipe split body, and an outer helical layer formation process of forming an outer helical layer outside the high helical layer. In the high helical layer formation process, the high helical layer may be formed to cover the pipe split body and extend over a part of each of the dome split bodies beyond an assembled region of the pipe split body and each of the dome split bodies. In this manner, outward expansion of the dome split body due to the restoring force of the pipe split body can be curbed, so that distortion in the assembled region of the pipe split body and the dome split body can be reduced, and the contact state between the pipe liner and the dome liner can be maintained.

The method of manufacturing the high-pressure tank according to the second aspect may further include a sealing inspection process of inspecting sealing performance of the assembly, between the assembling process and the helical layer formation process, and a negative pressure may be applied to the interior of the assembly in the sealing inspection process. In this manner, if there is a sealing problem in the assembly, the assembly can be disassembled to allow a split body causing the problem to be replaced with another one. Thus, the split body causing the problem can be easily replaced, as compared with the case where the sealing inspection is conducted after the helical layer is formed outside the assembly and the resin is cured or solidified, for example.

According to the second aspect, the high-pressure tank can be easily manufactured.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
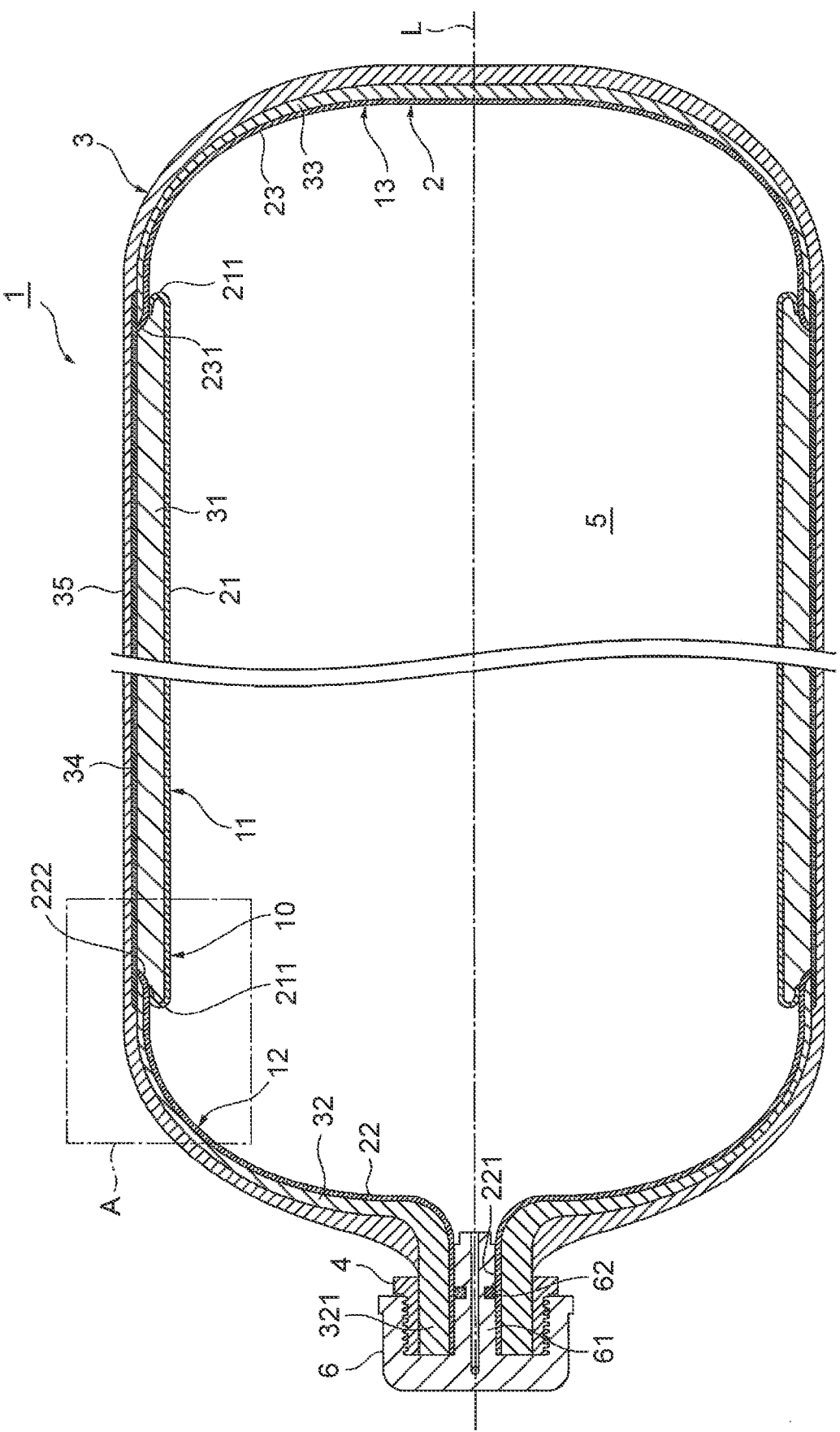
FIG. 1 is a schematic cross-sectional view showing the structure of a high-pressure tank according to one embodiment.

Referring to the drawings, a high-pressure tank and a method of manufacturing the high-pressure tank according to one embodiment of the disclosure will be described. In this embodiment, a high-pressure tank 1 is installed in a fuel cell electric vehicle, and its interior is filled with high-pressure hydrogen gas. However, the high-pressure tank 1 may be used in other applications. The gas with which the high-pressure tank 1 can be filled is not limited to the high-pressure hydrogen gas, but may be selected from various compressed gases such as compressed natural gas (CNG), various liquefied gases such as liquefied natural gas (LNG) and liquefied petroleum gas (LPG), and other gases.

High-Pressure Tank

Figure 2:
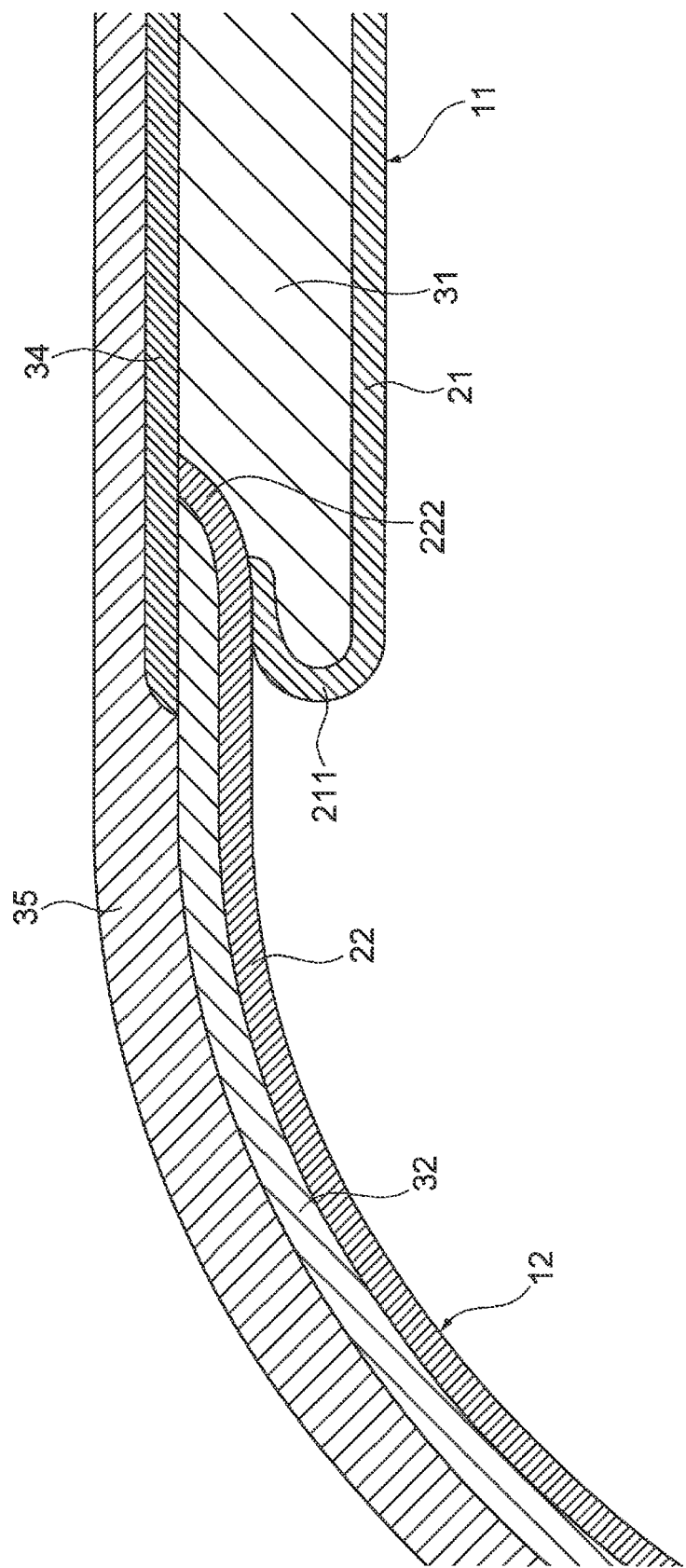
FIG. 2 is an enlarged cross-sectional view showing a portion denoted by A in FIG. 1.

First, the structure of the high-pressure tank will be described based on FIG. 1 and FIG. 2. FIG. 1 is a schematic cross-sectional view showing the structure of the high-pressure tank according to the embodiment, and FIG. 2 is an enlarged cross-sectional view showing a portion denoted by A in FIG. 1. The high-pressure tank 1 of this embodiment is a generally cylindrical high-pressure gas storage container with both ends rounded into a dome shape. The high-pressure tank 1 includes a liner 2 having gas barrier properties, a reinforcing portion 3 that covers the outer circumferential surface of the liner 2 and has a plurality of reinforcement layers, and a boss 4 attached to one end portion of the high-pressure tank 1.

The liner 2 is a hollow container having a storage space 5 in which high-pressure hydrogen is stored, and is formed of a resin material having gas barrier properties against hydrogen gas. The liner 2 consists of a cylindrical pipe liner 21 and a pair of dome liners (a first dome liner 22, a second dome liner 23) located on the opposite sides of the pipe liner 21. The pipe liner 21 extends a predetermined length in the direction of the axis L of the high-pressure tank 1. The first dome liner 22 and the second dome liner 23 are formed continuously on the opposite sides of the pipe liner 21, and the diameter of each of the first and second dome liners 22, 23 decreases in a direction away from the pipe liner 21.

Of the first dome liner 22 and the second dome liner 23, the first dome liner 22 has a tubular portion 221 formed in its portion having the most reduced diameter. An end portion 222 of the first dome liner 22 opposite the tubular portion 221 is formed to warp toward the outside of the high-pressure tank 1. Similarly, an end portion 231 of the second dome liner 23 is also formed to warp toward the outside of the high-pressure tank 1.

It is preferable that the resin material that forms the liner 2 has good gas barrier properties, namely, the ability to retain the filling gas in the storage space 5. Such resin materials include thermoplastic or thermosetting resins that will be described later.

The boss 4 is formed by machining a metal material such as aluminum or aluminum alloy into a predetermined shape. A valve 6 used for filling and discharging hydrogen gas into and from the storage space 5 is attached to the boss 4. The valve 6 is screwed to the boss 4. The valve 6 has an inserted portion 61 that is inserted into the tubular portion 221 of the first dome liner 22 to close the tubular portion 221. The inserted portion 61 is provided with a circumferential groove. An O-ring 62 that maintains seal (in other words, fluid-tightness) between the inserted portion 61 and the tubular portion 221 is fitted in the circumferential groove.

The reinforcing portion 3 has the function of reinforcing the liner 2 so as to improve the mechanical strength, such as rigidity and pressure resistance, of the high-pressure tank 1, and has a plurality of (in this embodiment, five) reinforcement layers formed by fiber-reinforced resin, or the like, in which reinforcing fibers (continuous fibers) are impregnated with resin. Specifically, the reinforcing portion 3 has a pipe reinforcement layer 31 that covers the outer circumferential surface of the pipe liner 21, a first dome reinforcement layer 32 that covers the outer circumferential surface of the first dome liner 22, a second dome reinforcement layer 33 that covers the outer circumferential surface of the second dome liner 23, a high helical layer 34 that covers the entire pipe reinforcement layer 31, a part of the first dome reinforcement layer 32, and a part of the second dome reinforcement layer 33, and an outer helical layer 35 that covers the entire high helical layer 34, a part of the first dome reinforcement layer 32, and a part of the second dome reinforcement layer 33. The high helical layer 34 and the outer helical layer 35 correspond to the "helical layer" mentioned in the claims.

The pipe reinforcement layer 31 is a reinforcement layer corresponding to the pipe liner 21, and has a cylindrical shape following the shape of the pipe liner 21. The pipe reinforcement layer 31 is formed by fiber-reinforced resin in which reinforcing fibers are impregnated with resin. The reinforcing fibers of the pipe reinforcement layer 31 are circumferentially oriented at an angle approximately orthogonal to the axis L direction of the high-pressure tank 1. In other words, the reinforcing fibers of the pipe reinforcement layer 31 are oriented in the circumferential direction of the high-pressure tank 1.

The first dome reinforcement layer 32 is a reinforcement layer corresponding to the first dome liner 22, and has a dome shape following the shape of the first dome liner 22. As shown in FIG. 1, the first dome reinforcement layer 32 has a protruding portion 321 that covers the outer circumferential surface of the tubular portion 221. The first dome reinforcement layer 32 is formed by fiber-reinforced resin in which reinforcing fibers are impregnated with resin. The reinforcing fibers of the first dome reinforcement layer 32 are not oriented in the circumferential direction of the high-pressure tank 1, but extend in various directions that intersect the circumferential direction of the high-pressure tank 1.

The second dome reinforcement layer 33 is a reinforcement layer corresponding to the second dome liner 23, and has a dome shape following the shape of the second dome liner 23. The second dome reinforcement layer 33 is formed by fiber-reinforced resin in which reinforcing fibers are impregnated with resin. The reinforcing fibers of the second dome reinforcement layer 33 are not oriented in the circumferential direction of the high-pressure tank 1, but extend in various directions that intersect the circumferential direction of the high-pressure tank 1.

In this connection, the reinforcing fibers of the pipe reinforcement layer 31 are not continuous (not connected) with the reinforcing fibers of the first dome reinforcement layer 32 or the second dome reinforcement layer 33. This is because the pipe reinforcement layer 31, first dome reinforcement layer 32, and second dome reinforcement layer 33 are formed separately, as will be described later.

In this embodiment, the pipe liner 21 and the pipe reinforcement layer 31 that covers the outer circumferential surface of the pipe liner 21 constitute a pipe split body 11, and the first dome liner 22 and the first dome reinforcement layer 32 that covers the outer circumferential surface of the first dome liner 22 constitute a first dome split body 12. The second dome liner 23 and the second dome reinforcement layer 33 that covers the outer circumferential surface of the second dome liner 23 constitute a second dome split body 13.

In the axis L direction of the high-pressure tank 1, one end portion of the pipe split body 11 is assembled with the first dome split body 12, and the other end portion of the pipe split body 11 is assembled with the second dome split body 13, so that the pipe split body 11, the first dome split body 12, and the second dome split body 13 form an assembly 10. The pipe split body 11 and the first dome split body 12 are assembled such that the first dome liner 22 is located in the outer portion of the high-pressure tank 1 relative to the pipe liner 21. Similarly, the pipe split body 11 and the second dome split body 13 are assembled such that the second dome liner 23 is located in the outer portion of the high-pressure tank 1 relative to the pipe liner 21.

The opposite end portions of the pipe liner 21 in the axis L direction of the high-pressure tank 1 are folded end portions 211 that are folded back toward the outside of the high-pressure tank 1. Specifically, the folded end portion 211 is folded back toward the outside of the high-pressure tank 1 to surround an end portion of the pipe reinforcement layer 31 located outside the pipe liner 21, and is formed to extend to about a half of the thickness of the pipe reinforcement layer 31. In an assembled region of the pipe split body 11 and the first dome split body 12 or the second dome split body 13, the folded end portion 211 of the pipe liner 21 is in contact with the first dome liner 22 or the second dome liner 23.

More specifically, in the assembled region of the pipe split body 11 and the first dome split body 12, the folded end portion 211 of the pipe liner 21 is in contact with an end portion 222 of the first dome liner 22. In the assembled region of the pipe split body 11 and the second dome split body 13, the folded end portion 211 of the pipe liner 21 is in contact with an end portion 231 of the second dome liner 23. The "assembled region" mentioned herein means a portion where the pipe split body 11 overlaps the first dome split body 12 or the second dome split body 13.

Preferably, the thickness of the first dome liner 22 and that of the second dome liner 23 are both larger than the thickness of the pipe liner 21. In this case, unevenness in the contact position between the pipe liner 21 and the first dome liner 22 or the second dome liner 23 can be absorbed, which yields the effect of ensuring the sealing performance of the liner 2 formed by the pipe liner 21, first dome liner 22, and second dome liner 23.

The high helical layer 34 is a reinforcement layer formed by high angle helical winding of fiber bundles having reinforcing fibers impregnated with resin, on the outside of the assembly 10. The helical winding is a manner of winding a fiber bundle at a winding angle that is larger than 0° and smaller than 90° with respect to the axis L direction of the high-pressure tank 1. The helical winding is classified into low angle helical winding and high angle helical winding depending on the size of the winding angle. The low angle helical winding is helical winding in the case where the winding angle is small (for example, is larger than 0° and equal to or smaller than 30°), and the high angle helical winding is helical winding in the case where the winding angle is large (for example, is larger than 30° and smaller than 90°).

Since the high helical layer 34 is formed by high angle helical winding of the fiber bundles having reinforcing fibers impregnated with resin, the reinforcing fibers of the high helical layer 34 are oriented to be inclined relative to the axis L direction of the high-pressure tank 1. As shown in FIG. 1 and FIG. 2, the high helical layer 34 is formed not only over the entire area of the pipe reinforcement layer 31, but its one end portion extends over a part of the first dome split body 12 beyond the assembled region of the pipe split body 11 and the first dome split body 12, and the other end portion extends over a part of the second dome split body 13 beyond the assembled region of the pipe split body 11 and the second dome split body 13.

The outer helical layer 35 is a reinforcement layer located in the outermost portion of the high-pressure tank 1, and is formed by low angle helical winding of fiber bundles having reinforcing fibers impregnated with resin, on the outside of the assembly 10 and the high helical layer 34. The reinforcing fibers of the outer helical layer 35 are also oriented to be inclined relative to the axis L direction of the high-pressure tank 1.

In the high-pressure tank 1 constructed as described above, the pipe split body 11 has the pipe liner 21 and the pipe reinforcement layer 31 covering the outer circumferential surface of the pipe liner 21, the first dome split body 12 has the first dome liner 22 and the first dome reinforcement layer 32 covering the outer circumferential surface of the first dome liner 22, and the second dome split body 13 has the second dome liner 23 and the second dome reinforcement layer 33 covering the outer circumferential surface of the second dome liner 23. The pipe split body 11 is assembled with the first dome split body 12 or the second dome split body 13 such that the first dome liner 22 or the second dome liner 23 is located in the outer portion of the high-pressure tank 1 relative to the pipe liner 21. Thus, the high-pressure tank 1 can be easily manufactured because the liner 2 can be formed simply by assembling the pipe split body 11 with the first dome split body 12 and the second dome split body 13.

The opposite end portions of the pipe liner 21 are the folded end portions 211 that are folded back toward the outside of the high-pressure tank 1. The folded end portion 211 is in contact with the first dome liner 22 in the assembled region of the pipe split body 11 and the first dome split body 12, and the folded end portion 211 is in contact with the second dome liner 23 in the assembled region of the pipe split body 11 and the second dome split body 13. With this arrangement, the liner 2 formed by the pipe liner 21, first dome liner 22 and second dome liner 23 can ensure the sealing performance.

Furthermore, the high helical layer 34 is formed not only over the entire area of the pipe reinforcement layer 31, but its one end portion extends over a part of the first dome split body 12 beyond the assembled region of the pipe split body 11 and the first dome split body 12, and the other end portion extends over a part of the second dome split body 13 beyond the assembled region of the pipe split body 11 and the second dome split body 13. With this arrangement, the contact state between the pipe liner 21 and the first dome liner 22 and the contact state between the pipe liner 21 and the second dome liner 23 are maintained by the high helical layer 34. Thus, distortion in the assembled region of the pipe split body 11 and the first dome split body 12, and distortion in the assembled region of the pipe split body 11 and the second dome split body 13, can be respectively reduced, and the sealing performance of the high-pressure tank 1 can be enhanced.

Method of Manufacturing High-Pressure Tank

Figure 3:
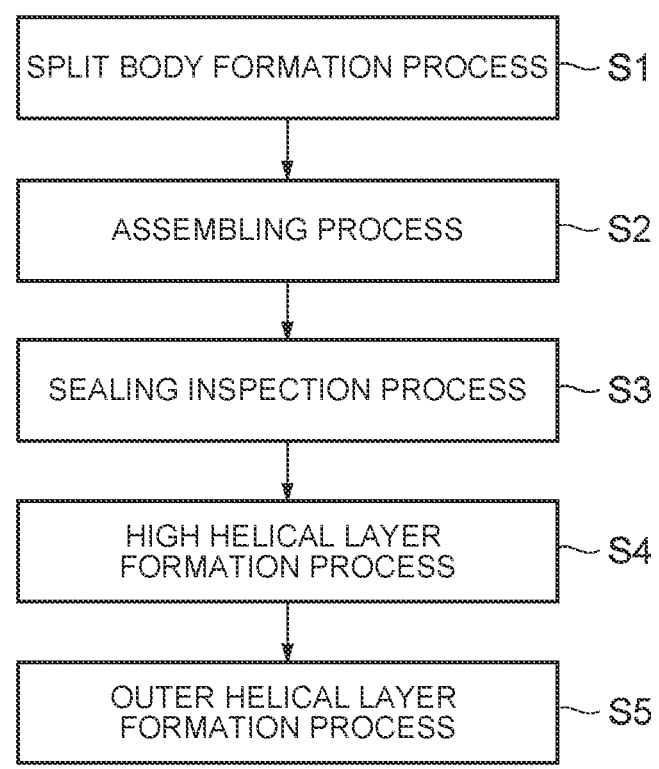
FIG. 3 is a process diagram showing a method of manufacturing the high-pressure tank according to the embodiment.

A method of manufacturing the high-pressure tank 1 will be described. FIG. 3 is a process diagram showing a method of manufacturing the high-pressure tank according to one embodiment. The method of manufacturing the high-pressure tank 1 includes a split body formation process S1, assembling process S2, sealing inspection process S3, high helical layer formation process S4, and outer helical layer formation process S5. The high helical layer formation process S4 and the outer helical layer formation process S5 constitute the "helical layer formation process" mentioned in the claims.

Split Body Formation Process S1

The split body formation process S1 is the process of forming the pipe split body 11, first dome split body 12, and second dome split body 13, respectively. The formation of the pipe split body 11 and the formation of the first dome split body 12 and the second dome split body 13, which are independent of each other, may be done in parallel, or either one may be done before the other. Here, the method of forming the first dome split body 12 and the second dome split body 13 will be initially described, and then the method of forming the pipe split body 11 will be described.

Figure 4:
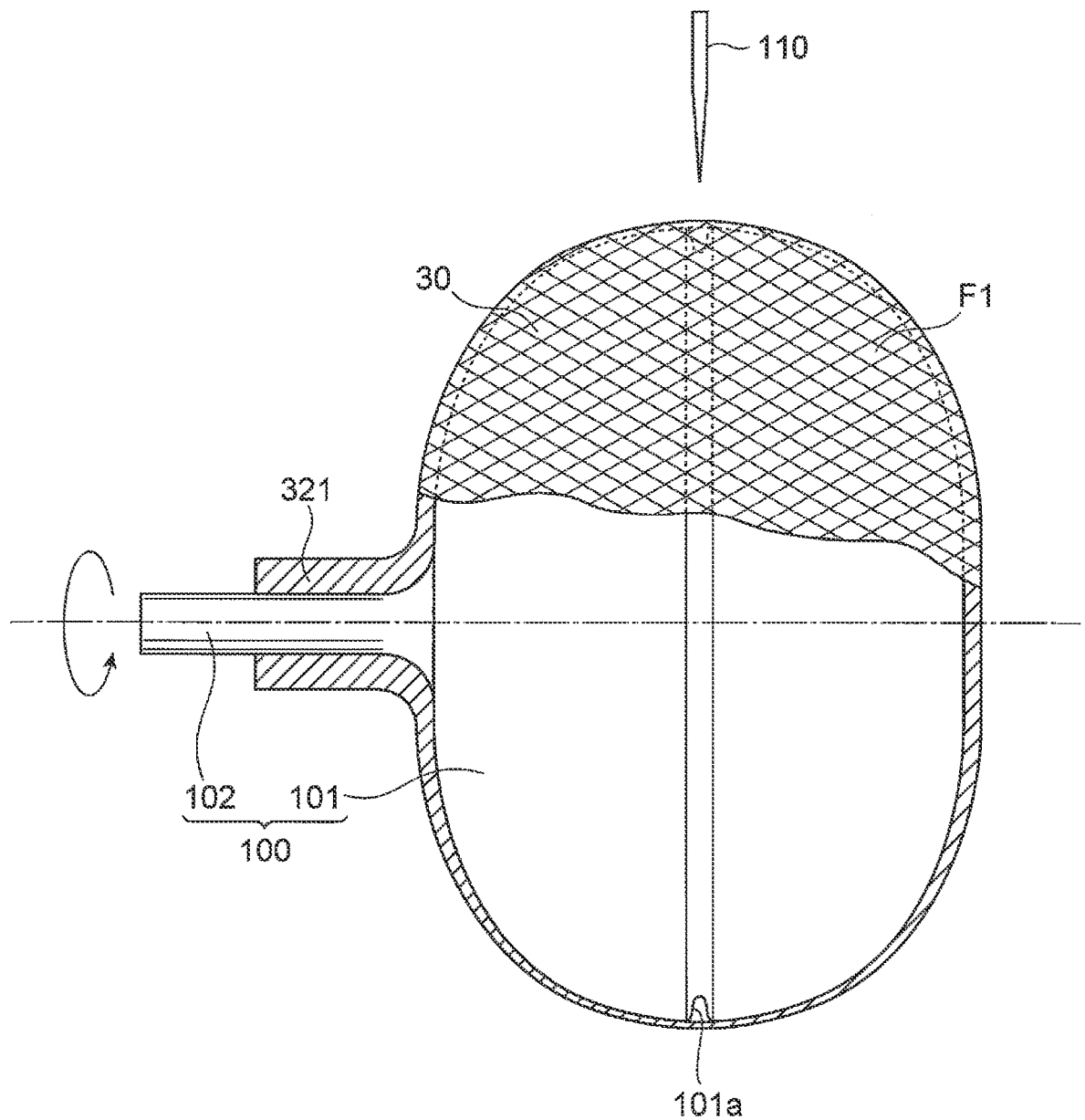
FIG. 4 is a cross-sectional view useful for describing formation of dome split bodies in a split body formation process.

In the method of forming the first dome split body 12 and the second dome split body 13, fiber bundles F1 impregnated with resin are wound around the outer circumferential surface of the mandrel 100 by the FW method, for example, as shown in FIG. 4. Specifically, the mandrel 100 has a main body 101 and a shaft portion 102 that extends outward from one end of the main body 101. The main body 101 is formed in a circular shape as viewed in the axial direction of the shaft portion 102. A groove 101a that extends circumferentially around the circumference of the main body 101 is formed in the outer circumferential surface of the middle of the main body 101 in the axial direction. The shaft portion 102 is rotatably supported by a rotating mechanism (not shown).

By rotating the mandrel 100, a wound body 30 is formed by winding the fiber bundles F1 so as to cover the outer circumferential surface of the mandrel 100. At this time, the fiber bundles F1 are also wound around the outer circumferential surface of the shaft portion 102, so that a cylindrical protruding portion 321 having a through-hole 322 (see FIG. 5) is formed. The fiber bundles F1 are wound at a winding angle of 30° to 50°, for example, relative to the axial direction of the shaft portion 102. The material of the mandrel 100 is not particularly limited, but is preferably metal, to ensure strength that keeps the mandrel 100 from being deformed when the fiber bundles F1 are wound around it.

The resin with which the fiber bundles F1 are impregnated is not particularly limited, but thermosetting resin may be used, for example. Preferably, thermosetting resins such as phenol resin, melamine resin, urea resin, and epoxy resin are used. In this case, the fiber bundles F1 are wound around the mandrel 100 in a condition where the thermosetting resin is uncured. In particular, it is preferable to use epoxy resin in terms of mechanical strength, etc. The epoxy resin has fluidity in the uncured state, and forms a tough cross-linked structure after it is thermally cured.

As the resin with which the fiber bundles F1 are impregnated, thermoplastic resin may also be used. As the thermoplastic resin, polyether ether ketone, polyphenylene sulfide, polyacrylic ester, polyimide, polyamide, nylon 6, nylon 6, 6, polyethylene terephthalate, etc. may be used. In this case, the fiber bundles F1 are wound around the mandrel 100, in a condition where the thermoplastic resin is heated and softened.

As fibers that constitute the fiber bundles F1, glass fibers, aramid fibers, boron fibers, carbon fibers, etc. may be used.

In particular, it is preferable to use carbon fibers in terms of light weight and mechanical strength.

Figure 5:
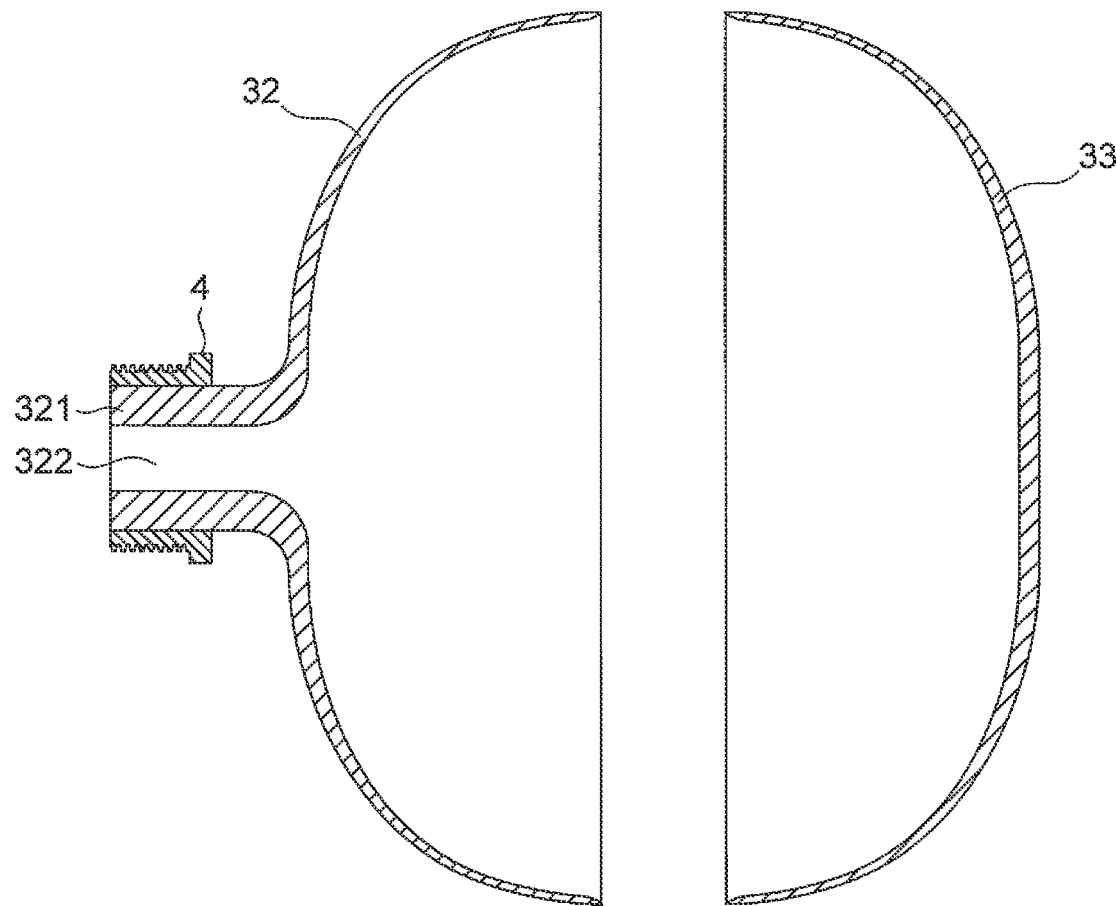
FIG. 5 is a cross-sectional view useful for describing formation of the dome split bodies in the split body formation process.

Next, the wound body 30 formed around the outer circumferential surface of the mandrel 100 is divided into two pieces by use of a cutter 110 (see FIG. 4). Then, the wound body 30 thus split is separated from the mandrel 100, to form a pair of dome reinforcement layers (the first dome reinforcement layer 32 and the second dome reinforcement layer 33), as shown in FIG. 5.

Specifically, the boss 4 is attached to the outer circumferential surface of the protruding portion 321, in the condition shown in FIG. 4. Then, the resin of the wound body 30 (i.e., the resin of the fiber bundles F1) is thermally cured or solidified. Namely, when the resin with which the fiber bundles F1 are impregnated is a thermosetting resin, the wound body 30 is heated so that the uncured thermosetting resin is brought into a completely cured state. Here, the "completely cured state" refers to the state in which the polymerization reaction of the uncured thermosetting resin is completed and no further curing occurs by heating. If the shapes of the first dome reinforcement layer 32 and the second dome reinforcement layer 33 can be surely retained, the wound body 30 is heated so that the uncured thermosetting resin is brought into an incompletely cured state.

The "incompletely cured state" refers to the state in which the polymerization reaction of the uncured thermosetting resin progresses by heating, and the fluidity of the thermosetting resin is reduced so that its shape can be surely retained in the subsequent process. In the following description of the specification, the completely cured state will be called "main curing", the incompletely cured state will be called "pre-curing", and these will be collectively called "thermal curing". On the other hand, when the resin with which the fiber bundles F1 are impregnated is a thermoplastic resin, the thermoplastic resin in the softened state is cooled, and the resin of the fiber bundles F1 is solidified.

In a condition where the resin with which the fiber bundles F1 are impregnated is thermally cured or solidified, the cutting edge of the cutter 110 is inserted into the groove 101a of the mandrel 100 while the mandrel 100 is rotated. In this manner, the fiber bundles F1 are cut with the cutter 110, and the wound body 30 can be divided into two pieces. The divided wound body 30 is separated from the mandrel 100, to form a pair of dome reinforcement layers. One of the dome reinforcement layers thus formed, which has the protruding portion 321, will be referred to as the first dome reinforcement layer 32, and the other dome reinforcement layer that does not have the protruding portion 321 will be referred to as the second dome reinforcement layer 33. The type of the cutter 110 is not particularly limited, but the one having a blade formed on the outer circumferential surface of a rotating disc, the one having a blade formed on a side face of a thin plate, or the one that cuts the fiber bundles F1 with laser light may be used, for example.

The fiber bundles F1 are cut with the cutter 110 in the condition where the resin with which the fiber bundles F1 are impregnated is thermally cured or solidified. Therefore, deformation of the fiber bundles F1 during cutting can be curbed, and deformation of the first dome reinforcement layer 32 and the second dome reinforcement layer 33 when removed from the mandrel 100 can be curbed.

While the fiber bundles F1 are cut with the cutter 110 in the condition where the resin of the fiber bundles F1 is thermally cured or solidified in this embodiment, the fiber bundles F1 may be cut with the cutter 110 without causing the resin to be thermally cured or solidified. In this case, the resin may be thermally cured or solidified after the fiber bundles F1 are cut with the cutter 110.

Figure 6:
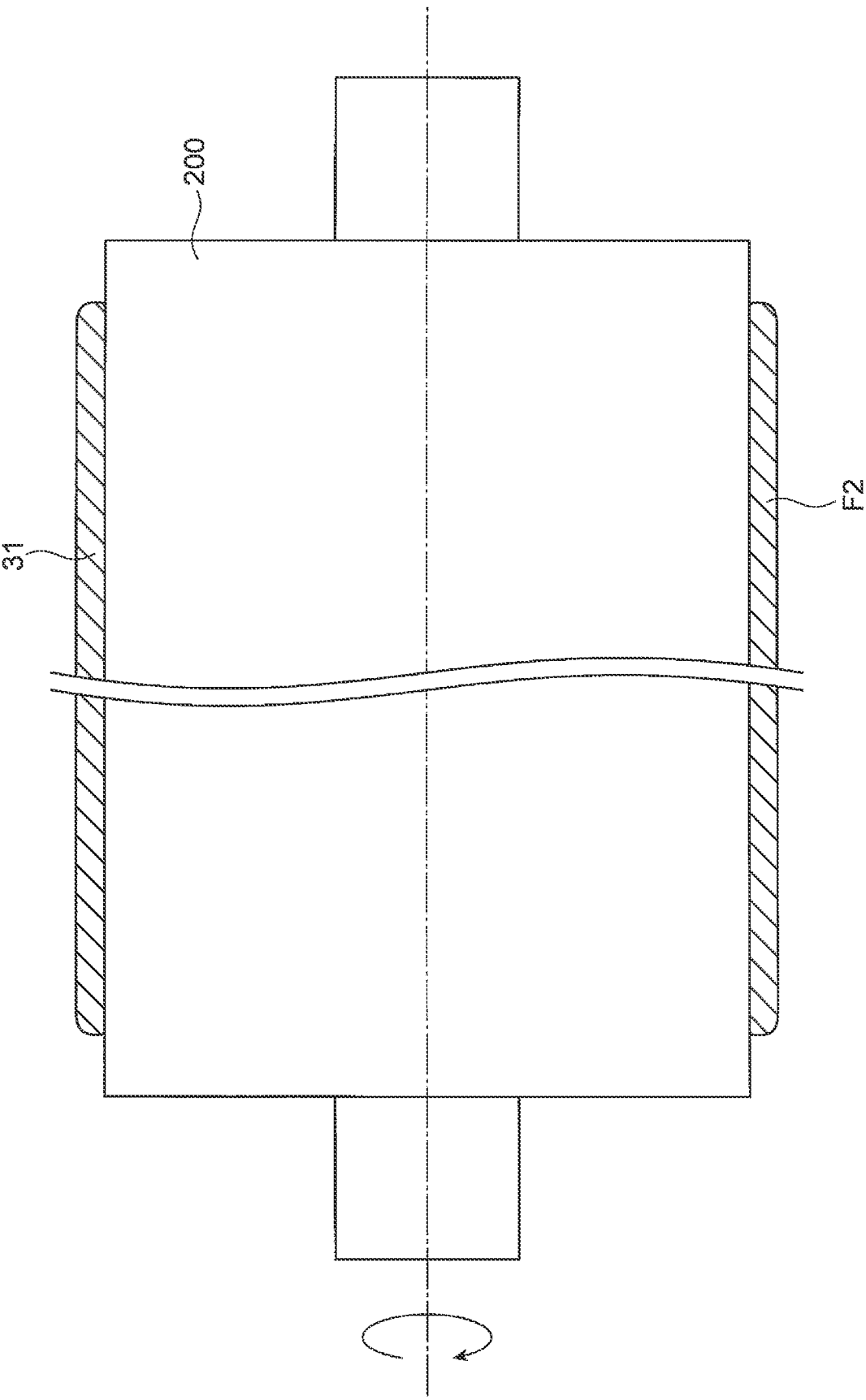
FIG. 6 is a cross-sectional view useful for describing formation of a pipe split body in the split body formation process.

On the other hand, the pipe reinforcement layer 31 is formed by winding a fiber sheet F2 around the outer surface of a cylindrical mandrel 200, for example, as shown in FIG. 6. The outside diameter of the mandrel 200 is equivalent to the inside diameter of the pipe reinforcement layer 31. While the material of the mandrel 200 is not particularly limited, it is preferably metal, to ensure strength that keeps the mandrel 200 from being deformed when the fiber sheet F2 is attached to it.

To form the pipe reinforcement layer 31, the fiber sheet F2 is unrolled and wound a plurality of times around the mandrel 200 while the mandrel 200 is rotated in the circumferential direction by a rotating mechanism (not shown). The fiber sheet F2 is a sheet of reinforcing fibers aligned in one direction and impregnated with resin, and the fiber sheet F2 is wound around the mandrel 200 such that the reinforcing fibers are oriented in the circumferential direction of the mandrel 200. In this manner, the pipe reinforcement layer 31 with the reinforcing fibers oriented in the circumferential direction is formed.

As the fiber sheet F2, a so-called UD (Uni-Direction) sheet in which a plurality of fiber bundles aligned in one direction is interwoven with restraint yarns is used, for example. However, a fiber sheet in which a plurality of fiber bundles aligned in a single direction are interwoven with a plurality of fiber bundles intersecting at right angles, for example, with the fiber bundles may also be used.

The reinforcing fibers of the fiber sheet F2 may be selected from materials similar to the materials listed by way of example for the fiber bundles F1, and the resin with which the reinforcing fibers are impregnated may be selected from resins similar to the materials listed by way of example for the fiber bundles F1.

When the resin of the fiber sheet F2 is a thermosetting resin, the fiber sheet F2 wound around the mandrel 200 may be thermally cured under conditions (heating temperature and heating time) for pre-curing or main curing, as in the case of the fiber bundles F1. On the other hand, when the resin of the fiber sheet F2 is a thermoplastic resin, the fiber sheet F2 wound around the mandrel 200 may be solidified by cooling, as in the case of the fiber bundles F1.

After the resin is thermally cured or solidified, the pipe reinforcement layer 31 is removed from the mandrel 200. Through thermal curing or solidification of the resin, the ability of the pipe reinforcement layer 31 to retain its shape is enhanced. Thus, the pipe reinforcement layer 31 can be easily demolded from the mandrel 200, and the pipe reinforcement layer 31 is less likely or unlikely to be deformed when it is removed from the mandrel 200.

While the pipe reinforcement layer 31 is formed by winding the fiber sheet F2 around the outer surface of the mandrel 200 in this embodiment, the pipe reinforcement layer 31 may be formed by hoop winding fiber bundles impregnated with resin around the outer surface of the mandrel 200 by the FW method. In another method, the pipe reinforcement layer 31 may be formed by a so-called centrifugal winding (CW) method, namely, by attaching a fiber sheet to the inner surface of the rotating mandrel 200.

Subsequently, the first dome liner 22 is formed on the inner surface of the first dome reinforcement layer 32 to form the first dome split body 12, and the second dome liner 23 is formed on the inner surface of the second dome reinforcement layer 33 to form the second dome split body 13.

Figure 7:
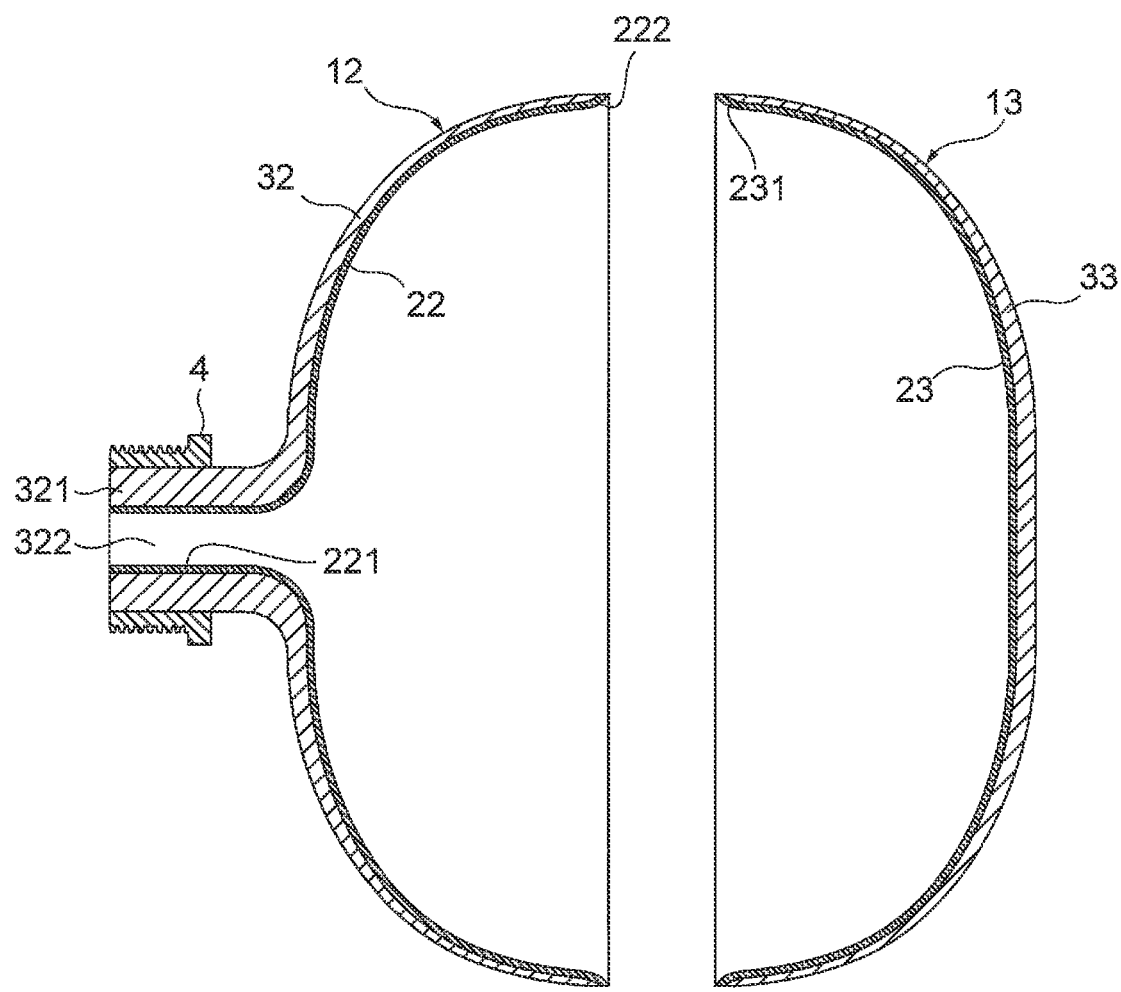
FIG. 7 is a cross-sectional view useful for describing formation of the dome split bodies in the split body formation process.

Specifically, the first dome liner 22 is formed by applying a liquid or softened resin material to the inner surface of the first dome reinforcement layer 32, or by attaching a sheet made of a resin material to the inner surface of the first dome reinforcement layer 32, for example. At this time, as shown in FIG. 7, the end portion 222 of the first dome liner 22 is formed to warp outward.

The resin material forming the first dome reinforcement layer 32 preferably has excellent gas barrier properties as described above, and may be selected from thermoplastic resins or thermosetting resins, for example. Examples of the thermoplastic resins include polypropylene resins, nylon resins (e.g., 6-nylon resin or 6,6-nylon resin), polycarbonate resins, acrylic resins, ABS resins, polyamide resins, polyethylene resins, ethylene-vinyl alcohol copolymer resin (EVOH), and polyester resins (e.g., polyethylene terephthalate). Examples of the thermosetting resins include epoxy resin, modified epoxy resin represented by vinylester resin, phenolic resin, melamine resin, urea resin, unsaturated polyester resin, alkyd resin, polyurethane resin, and thermosetting polyimide resin.

In another example, the first dome liner 22 may be formed by applying a two-component thermosetting resin such as epoxy resin to the inner surface of the first dome reinforcement layer 32, and drying the applied resin. In a further example, the first dome liner 22 made of a thermoplastic resin such as nylon 6 may be formed by applying a resin containing a thermoplastic resin monomer such as c-caprolactam and a catalyst to the inner surface of the first dome reinforcement layer 32, and heating it at a temperature equal to or higher than the temperature at which the thermoplastic resin monomer starts its polymerization reaction.

When the resin material of the first dome liner 22 is a thermosetting resin, the thermosetting resin may be an uncured one, or may be pre-cured by heating so that the thermosetting resin is not completely cured, or may be cured by heating so that the thermosetting resin is completely cured. When the resin material of the first dome liner 22 is a thermoplastic resin, the thermoplastic resin is solidified.

When the resin material is thermally cured or solidified, the first dome split body 12 having the first dome liner 22 and the first dome reinforcement layer 32 covering the outer circumferential surface of the first dome liner 22 is formed.

The method of forming the second dome split body 13 by forming the second dome liner 23 on the inner surface of the second dome reinforcement layer 33 is similar to that of forming the first dome split body 12 described above, and therefore will not be described. The second dome liner 23 is formed on the inner surface of the second dome reinforcement layer 33, so that the end portion 231 of the second dome liner 23 warps outward (see FIG. 7).

Figure 8:
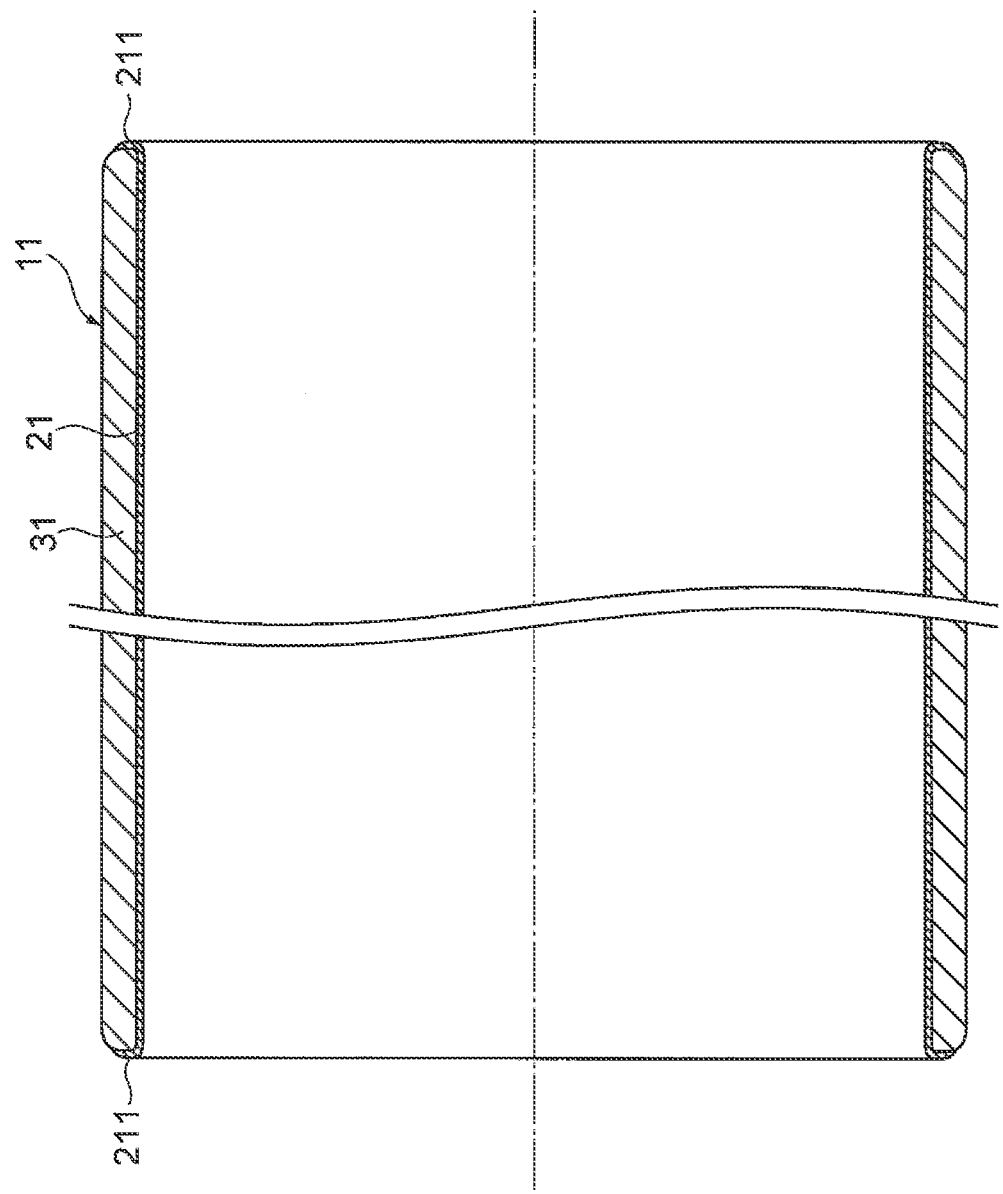
FIG. 8 is a cross-sectional view useful for describing formation of the pipe split body in the split body formation process.

Subsequently, the pipe liner 21 is formed on the inner surface of the pipe reinforcement layer 31, to form the pipe split body 11. The method of forming the pipe split body 11 is similar to that of forming the first dome split body 12 described above, and therefore will not be described. As shown in FIG. 8, the opposite end portions of the pipe liner 21 thus formed are respectively the folded end portions 211 that are folded outward.

When the first dome liner 22 is formed on the inner surface of the first dome reinforcement layer 32, the second dome liner 23 is formed on the inner surface of the second dome reinforcement layer 33, and the pipe liner 21 is formed on the inner surface of the pipe reinforcement layer 31, it is preferable that the thicknesses of the first dome liner 22 and the second dome liner 23 are both larger than the thickness of the pipe liner 21. With this arrangement, when the assembly 10 is formed in the subsequent assembling process S2, unevenness in the contact position between the pipe liner 21 and the first dome liner 22 or the second dome liner 23 can be absorbed, so that the liner 2 formed by the pipe liner 21, first dome liner 22, and second dome liner 23 can ensure the sealing performance.

Assembling Process S2

Figure 9:
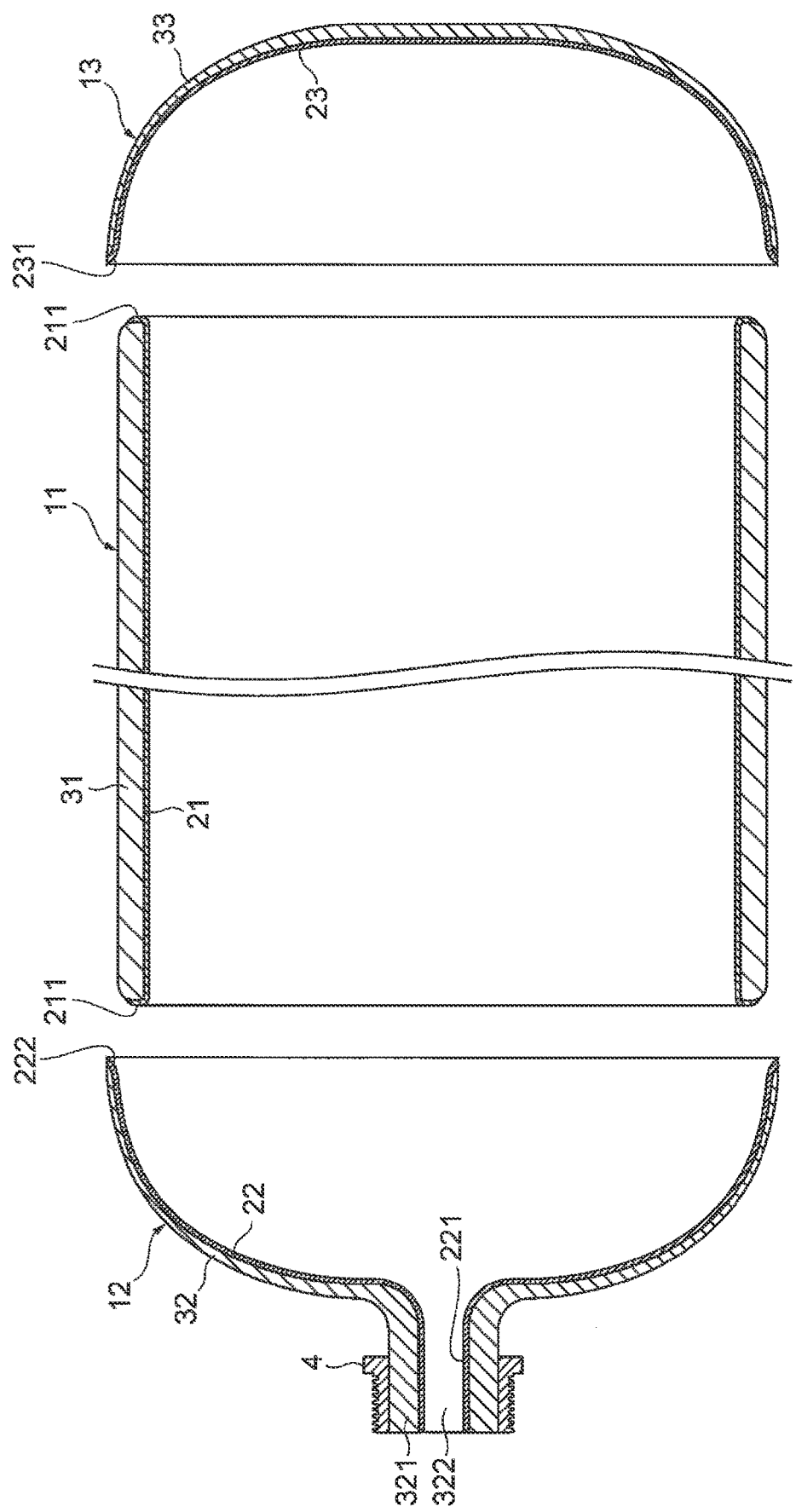
FIG. 9 is a cross-sectional view useful for describing an assembling process for assembling the pipe split body with the dome split bodies.

In the assembling process S2, the pipe split body 11 and the pair of dome split bodies (the first dome split body 12 and the second dome split body 13) formed in the split body formation process S1 are assembled together to form the assembly 10. As shown in FIG. 9, one end portion of the pipe split body 11 is mounted to the first dome split body 12, and the other end portion of the pipe split body 11 is mounted to the second dome split body 13. At this time, the first dome split body 12 and the pipe split body 11 are assembled such that the first dome liner 22 is located in the outer portion of the high-pressure tank 1 relative to the pipe liner 21, and the second dome split body 13 and the pipe split body 11 are assembled such that the second dome liner 23 is located in the outer portion of the high-pressure tank 1 relative to the pipe liner 21.

Figure 10:
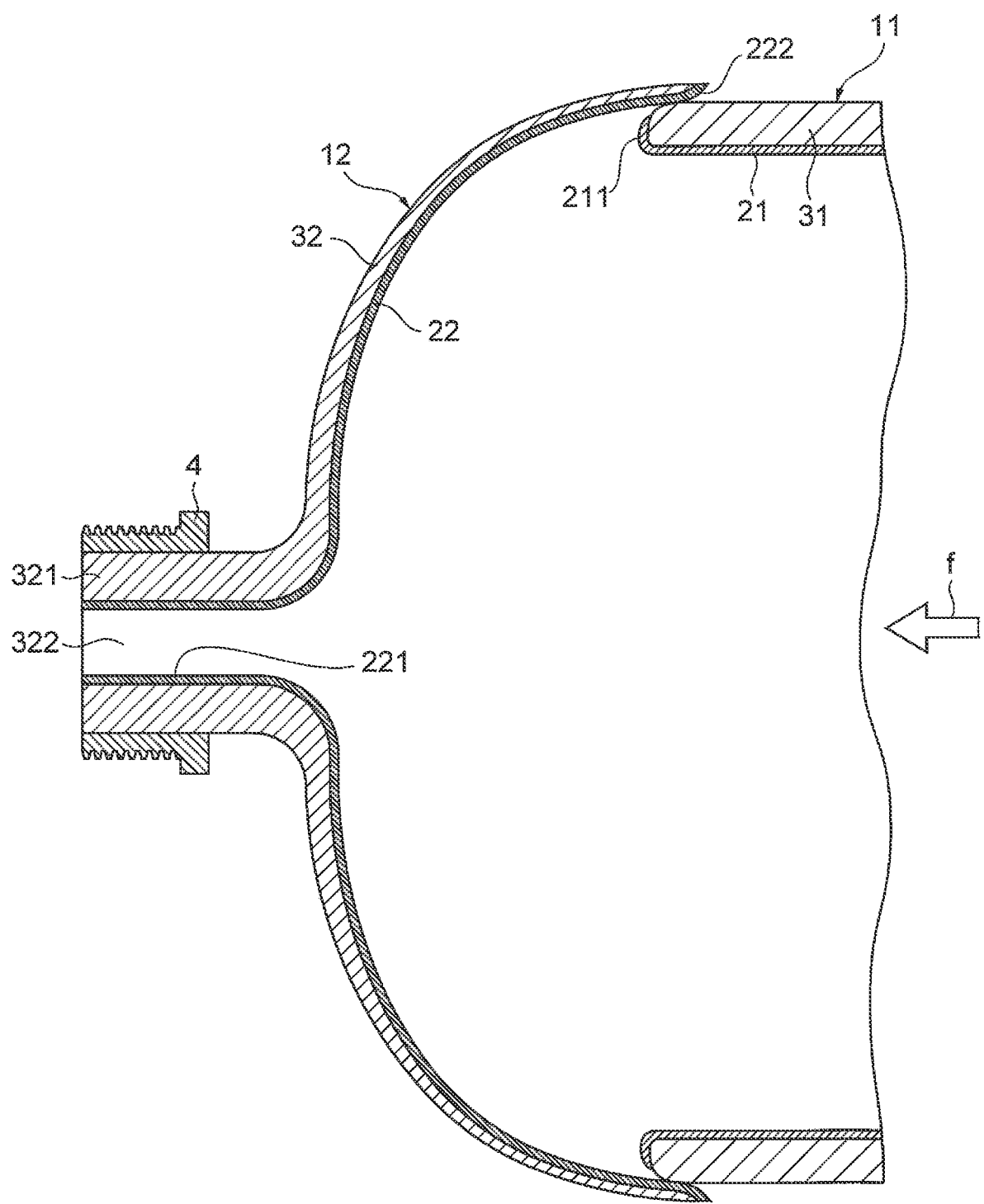
FIG. 10 is a partially enlarged cross-sectional view useful for describing press-fitting of the pipe split body into the dome split body.

More specifically, as shown in FIG. 10, initially, the pipe split body 11 is press-fitted into the first dome split body 12 with a predetermined pressing force f, so that the first dome liner 22 contacts the pipe reinforcement layer 31 without contacting the pipe liner 21. Similarly, the pipe split body 11 is press-fitted into the second dome split body 13 with the predetermined pressing force f, so that the second dome liner 23 contacts the pipe reinforcement layer 31 without contacting the pipe liner 21.

Then, when the pressing force f is released, the pipe split body 11 expands under restoring force. As a result, a force is applied from the pipe split body 11 located inside to the first dome split body 12 or the second dome split body 13 to expand the dome split body outward. Thus, the first dome liner 22 and the pipe liner 21 both deform, and the end portion 222 of the first dome liner 22 abuts against the folded end portion 211 of the pipe liner 21 (see FIG. 1). Then, a sealed portion of the liner 2 is formed at the contact position between the end portion 222 of the first dome liner 22 and the folded end portion 211 of the pipe liner 21. Similarly, the second dome liner 23 and the pipe liner 21 also deform, and the end portion 231 of the second dome liner 23 abuts against the folded end portion 211 of the pipe liner 21 (see FIG. 1). Then, a sealed portion of the liner 2 is formed at the contact position between the end portion 231 of the second dome liner 23 and the folded end portion 211 of the pipe liner 21. In this manner, the assembly 10 is formed.

When the pipe split body 11 is assembled with the first dome split body 12 or the second dome split body 13, the assembling operation may be performed after the pipe liner 21, first dome liner 22, and second dome liner 23 are heated to facilitate deformation of the liners. In this manner, unevenness in the contact position between the pipe liner 21 and the first dome liner 22 and unevenness in the contact position between the pipe liner 21 and the second dome liner 23 can be easily absorbed, thus making it easier to ensure the state of contact between the pipe liner 21 and the first dome liner 22 or the second dome liner 23. Alternatively, out of the pipe liner 21, the first dome liner 22, and the second dome liner 23, only the pipe liner 21, or only the first dome liner 22 and the second dome liner 23, may be heated. When the first dome liner 22 and the second dome liner 23 are formed with the larger thicknesses than the pipe liner 21, it is preferable to heat the first dome liner 22 and the second dome liner 23.

Sealing Inspection Process S3

The sealing inspection process S3 is a process of inspecting the sealing performance of the assembly 10 formed in the assembling process S2. In the sealing inspection process S3, the sealing performance of the assembly 10 is inspected by applying a negative pressure to the interior of the assembly 10. With the sealing inspection thus conducted in the state of the assembly 10, if air enters the assembly 10 (namely, if there is a sealing problem), the assembly 10 can be disassembled to allow a split body causing the problem to be replaced with another one. Accordingly, the split body causing the problem can be easily replaced, as compared with the case where the sealing inspection is conducted after the high helical layer 34 and the outer helical layer 35 are formed outside the assembly 10 and the resin is cured or solidified, for example.

High Helical Layer Formation Process S4

In the high helical layer formation process S4, the high helical layer 34 is formed by winding fiber bundles impregnated with resin on the outer circumferential surface of at least the pipe split body 11 of the assembly 10 having no problem in the sealing inspection, by high angle helical winding, to form layers. The number of the layers of the fiber bundles thus wound is not particularly limited provided that sufficient strength of the high helical layer 34 is ensured, but may be about 2 to 10 layers, for example.

The reinforcing fibers of the fiber bundles may be selected from materials similar to the materials listed by way of example for the fiber bundles F1 above, and the resin material with which the reinforcing fibers are impregnated may be selected from resins similar to the materials listed by way of example for the fiber bundles F1.

Figure 11:
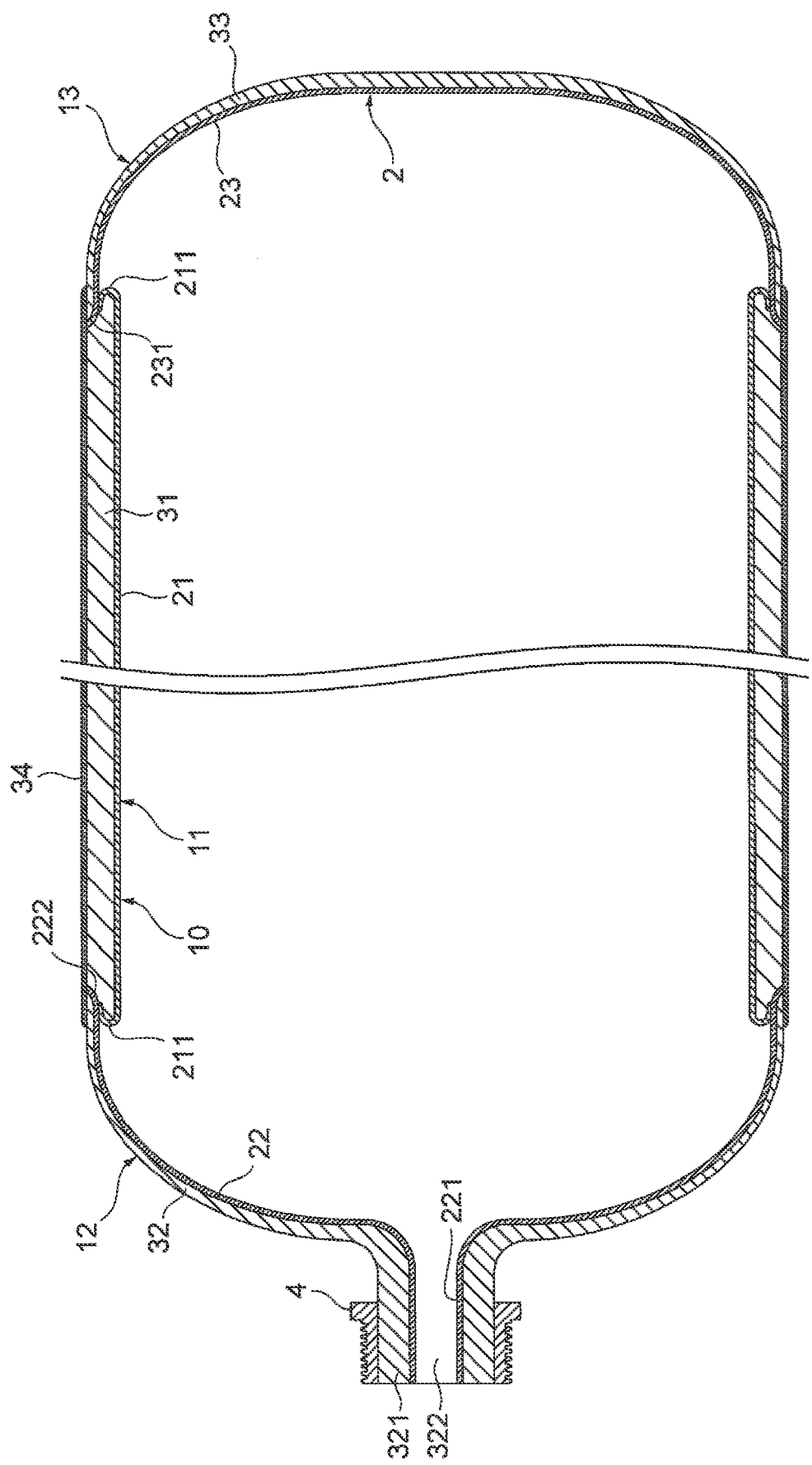
FIG. 11 is a cross-sectional view useful for describing a high helical layer formation process.

As shown in FIG. 11, the high helical layer 34 is formed not only over the entire area of the pipe reinforcement layer 31, but is formed such that one end portion of the high helical layer 34 extends over a part of the first dome split body 12 beyond the assembled region of the pipe split body 11 and the first dome split body 12, and the other end portion of the high helical layer 34 extends over a part of the second dome split body 13 beyond the assembled region of the pipe split body 11 and the second dome split body 13.

Outer Helical Layer Formation Process S5

In the outer helical layer formation process S5, the outer helical layer 35 is formed outside the high helical layer 34. More specifically, fiber bundles impregnated with resin are wound helically at a low angle in layers around the outer circumferential surface of the high helical layer 34 formed in the high helical layer formation process S4 and the outer circumferential surfaces of the first dome split body 12 and second dome split body 13 that are not covered with the high helical layer 34. The number of the layers of the fiber bundles thus wound is not limited provided that sufficient strength of the outer helical layer 35 is ensured, but may be about 2 to 10 layers, for example.

The reinforcing fibers of the fiber bundles may be selected from materials similar to the materials listed by way of example for the fiber bundles F1 above, and the resin material with which the reinforcing fibers are impregnated may be selected from resins similar to the materials listed by way of example for the fiber bundles F1.

After winding of the fiber bundles is completed, the outer helical layer 35 is subjected to main curing when the resin with which the fiber bundles are impregnated is a thermosetting resin. At this time, when the resin of the assembly 10 and the resin of the high helical layer 34 are thermosetting resins, and have not been completely cured, these resins are also subjected to main curing. When the resin with which the fiber bundles are impregnated is a thermoplastic resin, the outer helical layer 35 is let stand to cool or forced to cool, to be solidified.

After the outer helical layer 35 is formed in this manner, the valve 6 is attached to the boss 4, as shown in FIG. 1, so that the manufacture of the high-pressure tank 1 is completed.

In the method of manufacturing the high-pressure tank according to this embodiment, in the assembling process S2, the first dome split body 12 and the pipe split body 11 are assembled such that the first dome liner 22 is located in the outer portion of the high-pressure tank 1 relative to the pipe liner 21, and the second dome split body 13 and the pipe split body 11 are assembled such that the second dome liner 23 is located in the outer portion of the high-pressure tank 1 relative to the pipe liner 21. With this arrangement, the liner 2 can be formed merely by assembling the pipe split body 11, the first dome split body 12, and the second dome split body 13, thus making it easy to manufacture the high-pressure tank 1.

Also, in the assembling process S2, the pipe split body 11 is press-fitted into the first dome split body 12, such that the first dome liner 22 contacts the pipe reinforcement layer 31 without contacting the pipe liner 21, and the pipe split body 11 is press-fitted into the second dome split body 13, such that the second dome liner 23 contacts the pipe reinforcement layer 31 without contacting the pipe liner 21. In this manner, compared with the case where press-fitting of these split bodies is conducted such that the first dome liner 22 or the second dome liner 23 directly contacts the pipe liner 21, there is no rubbing of the liners against each other during press-fitting, and the sealed portions thus formed can be prevented from being damaged. Consequently, the sealing performance of the liner 2 can be ensured.

In the high helical layer formation process S4, the high helical layer 34 is formed not only over the entire area of the pipe reinforcement layer 31, but is formed such that one end portion of the high helical layer 34 extends over a part of the first dome split body 12 beyond the assembled region of the pipe split body 11 and the first dome split body 12, and the other end portion of the high helical layer 34 extends over a part of the second dome split body 13 beyond the assembled region of the pipe split body 11 and the second dome split body 13. In this manner, outward expansion of the first dome split body 12 or outward expansion of the second dome split body 13 due to the restoring force of the pipe split body 11 can be curbed, so that distortion in the assembled region of the pipe split body 11 and the first dome split body 12 or the second dome split body 13 can be reduced, and the contact state between the pipe liner 21 and the first dome liner 22 or the second dome liner 23 can be maintained.

While one embodiment of the disclosure has been described in detail, the disclosure is not limited to the illustrated embodiment, but various design changes can be made without departing from the principle of the disclosure described in the claims.

What is claimed is:

1. A high-pressure tank comprising:
an assembly having a pipe split body and two dome split bodies assembled together; and
a helical layer provided outside the assembly,
wherein the pipe split body has a pipe liner and a pipe reinforcement layer covering an outer circumferential surface of the pipe liner, wherein each of the dome split bodies has a dome liner and a dome reinforcement layer covering an outer circumferential surface of the dome liner, wherein the pipe liner is a separate member from the dome liner, wherein the pipe split body and the two dome split bodies are assembled such that the dome liner contacts an outer portion of the high-pressure tank relative to the pipe liner in a direction perpendicular to an axial direction of the pipe liner, wherein the pipe liner includes a central portion and an end portion, the central portion of the pipe liner extending in a first direction that is the axial direction, wherein the end portion of the pipe liner is folded back in a second direction opposite to the first direction, and wherein the end portion is in contact with the dome liner, in an assembled region of the pipe split body and each of the dome split bodies.

2. The high-pressure tank according to claim 1, wherein:

the helical layer has a high helical layer configured to cover at least the pipe split body, and an outer helical layer provided outside the high helical layer; and the high helical layer extends over a part of each of the dome split bodies beyond the assembled region of the pipe split body and each of the dome split bodies.

* * * * *